June 15, 1943.  F. D. CHAPMAN  2,321,994
RECEPTACLE FILLER
Filed Dec. 11, 1939  2 Sheets-Sheet 1

INVENTOR
F. D. Chapman
BY
Morsell, Lieber & Morsell
ATTORNEYS.

June 15, 1943.  F. D. CHAPMAN  2,321,994
RECEPTACLE FILLER
Filed Dec. 11, 1939   2 Sheets-Sheet 2
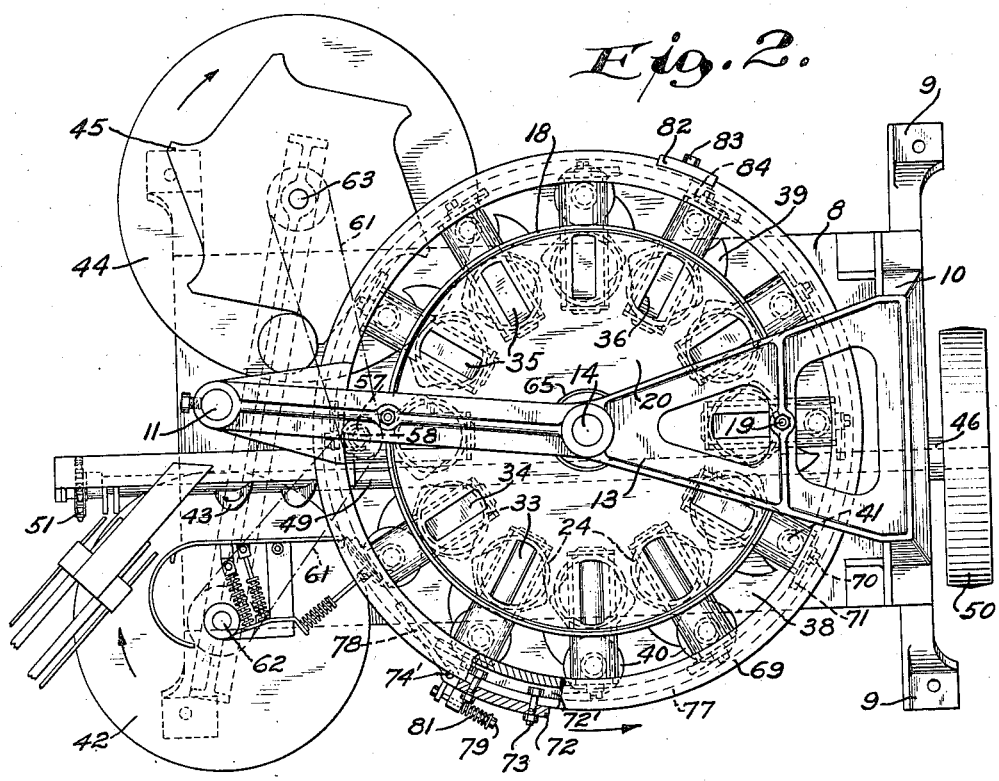
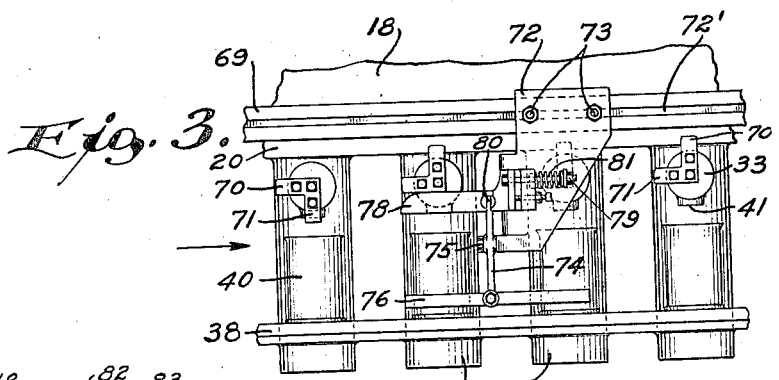
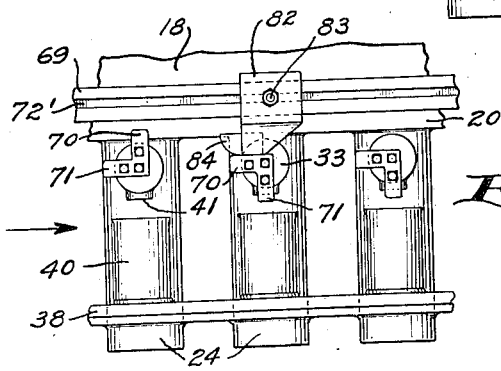
INVENTOR
F. D. Chapman
BY
Morsell, Lieber & Morsell
ATTORNEYS.

Patented June 15, 1943

2,321,994

UNITED STATES PATENT OFFICE 2,321,994

RECEPTACLE FILLER

Frank D. Chapman, Berlin, Wis.

Application December 11, 1939, Serial No. 308,615

2 Claims. (Cl. 226—97)

This invention relates to improvements in the art of dispensing fluent materials, and relates more specifically to improved apparatus for delivering pre-measured quantities of diverse materials to successive receptacles.

A general object of the invention is to provide an improved machine for delivering variable pre-measured charges of material to successive receptacles so that each receptacle will receive one or more accurately measured batches of predetermined volume.

Another general object of the invention is to provide a simple and highly efficient mechanism for effecting rapid, accurate, and automatic filling of receptacles in an expeditious manner.

Some of the more specific objects of the present invention are as follows:

To provide a new and useful receptacle filler adapted to accurately pre-measure successive batches of fluent material, and to deliver the charges to successive receptacles only when the latter are positioned to properly receive the measured quantities.

To provide an automatically operable machine for dispensing fluent material in pre-measured batches, and wherein the volumes of the measured charges can be quickly and accurately varied.

To provide an improved can filling machine which is especially adapted to fill tin cans or the like, of various sizes, with measured quantities of fluent materials of different kinds.

To provide an improved no-can-no-fill mechanism for receptacle filling machines or the like, which also cooperates with the batch measuring devices to effect variation in the volumes of the measured charges.

To provide an improved measuring pocket and control valve assemblage for can filling machines or the like, and improved mechanism for varying the active or effective stroke of the measuring pocket displacement plunger.

To provide various improvements in the construction and operation of receptacle fillers, whereby the cost of construction and operation is reduced to a minimum, while the efficiency is enhanced to a maximum.

To provide an improved material dispensing machine all parts of which are readily accessible for inspection and cleaning, and which may therefore be maintained in highly sanitary condition.

To provide an automatically functioning rotary can filling machine of durable construction, and which is effectively operable at high speed.

To provide various improvements in the details of construction and operation of receptacle filling machines such as disclosed in my prior Patent No. 2,220,707, granted November 5, 1940.

A clear conception of the several features constituting my present improvement, and of the construction and operation of a machine embodying these features may be had by referring to the drawings accompanying and forming a part of this specification wherein like reference characters designate the same or similar parts in the various views.

Fig. 2 is a top view of the receptacle filler of Fig. 1;

Fig. 3 is an outside view of a portion of one of the no-can-no-fill control valve actuating mechanisms, showing several of the adjacent measuring pockets;

Fig. 4 is an outside view of another portion of the improved no-can-no-fill control valve actuating mechanism, likewise showing several adjacent measuring pockets.

Figure 1:
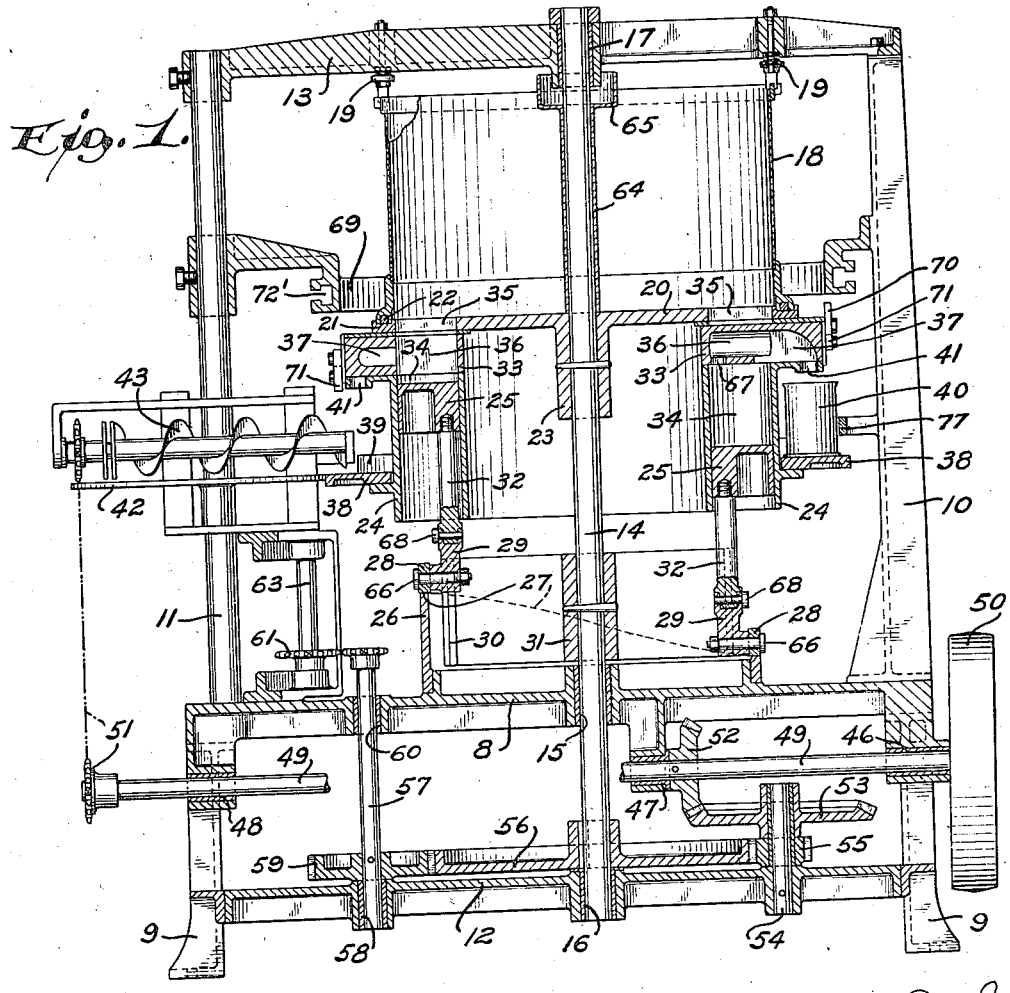
Fig. 1 is an approximately central vertical section through one of the improved receptacle fillers, showing the measuring pocket and control valve at the right side in material discharging position, and the pocket and valve at the left in material receiving position.

Although the invention has been successfully used in connection with an automatically operable rotary can filling machine such as shown herein, it is not the intent to unnecessarily limit its use or application to machines of this particular type, since the improved features may obviously be embodied in other types of mechanism.

Referring to the drawings, the improved automatic rotary receptacle filler shown therein comprises a main frame having a base member 8 provided with supporting legs 9 and upwardly extending standards 10 and a column 11, and also having lower and upper transverse bracing or supporting members 12, 13 respectively; a central upright shaft 14 journalled for rotation in guide bearings 15, 16, 17 carried by the frame members 8, 12, 13 respectively; a stationary fluent material supply reservoir 18 surrounding the upper portion of the central shaft 14 beneath the upper frame member 13, and being normally retained in proper position by oppositely disposed spring pressed elements 19 coacting with its upper rim; a plate 20 rotatable with the shaft 14 and providing a bottom for the reservoir 18, the plate having an annular upper recess 21 coacting with a sealing ring 22 carried by the reservoir 18, and also having a central hub 23 rigidly attached to the rotary shaft 14; an annular series of twelve batch measuring cylinders or pockets 24 depending from and revolvable with the plate 20, and each having therein a movable displacement member or reciprocable piston 25; an annular cam ring 26 secured to the base member 8 concentric with the shaft 14 and having an upper cam surface 27; actuating rollers 28 for the pistons 25 coacting with the surface 27, and secured to cross-heads 29 slidable in parallel guideways 30 of a revolving guide member 31, the cross-heads 29 being secured to their respective pistons 25 by means of connecting rods 32; a rotary control valve 33 interposed between the upper end of the displacement chamber 34 of each pocket 24 and a large radial slot 35 in the plate 20, each valve 33 being confined in a bore and having a through port 36 alineable with the adjacent slot 35 and also having an outwardly directed discharge passage 37 leading from the port 36; an annular receptacle supporting ring or disk 38 surrounding the group of pockets 24 and revolvable therewith, and having can hooks 39 for positioning receptacles 40 with their upper open ends beneath discharge orifices 41 formed in the control valve casings; mechanism including a supply disk 42 and a feed screw 43 for delivering empty receptacles 40 in succession to the support 38; mechanism including a discharge disk 44 and can hooks 45 for delivering loaded receptacles 40 in succession from the support 38; improved mechanism for actuating the rotary control valves 33; and mechanism for driving the various movable elements of the machine in unison.

The main frame assemblage should be of rigid construction, and the standards 10 and column 11 as well as the lower frame member 12 should be firmly attached to the base member 8. The upper transverse member 13 should also be firmly but detachably secured to the standards 10 and column 11 with the bearing 17 alined with the lower bearings 15, 16 so that the shaft 14 will be properly supported for rotation. The base section or member 8 is also provided with alined horizontal bearings 46, 47, 48 within which a driving shaft 49 is journalled, and one end of this shaft 49 is provided with a drive pulley 50, while the opposite end thereof is drivingly connected with the can feed screw 43 by means of chain gearing 51. Mounted upon the medial portion of the shaft 49 near the bearing 47, is a bevel gear 52 which meshes with another bevel gear 53 rotatable upon a stub shaft 54 secured to the lower frame member 12; and the bevel gear 53 is drivingly direct-connected to a pinion 55 which meshes with a large spur gear 56 keyed to the lower end of the upright shaft 14 above the bearing 16, thus imparting rotation from the drive shaft 49 to the shaft 14 and the elements carried thereby. A countershaft 57 journalled in a bearing 58 in the lower member 12, carries a pinion 59 which meshes with and is normally driven by the gear 56; and this countershaft also coacts with a bearing 60 in the frame member 8 and has its upper end drivingly connected by means of chain gearing 61, with the feed disk driving shaft 62 and with the discharge disk propelling shaft 63, see Fig. 2.

As previously indicated, the fluent material supply reservoir 18 which surrounds the upper part of the central shaft 14, is stationary and does not revolve with this shaft and with the bottom plate 20, and the seal ring 22 prevents escape of material from the reservoir 18 except through the slots 35. In order to prevent lubricant from the upper bearing 17 from entering the reservoir 18, the portion of the shaft 14 within the supply receptacle may be surrounded by a sleeve 64 having a pocket 65 at its upper end; and the spring pressed elements 19 which are carried by the upper frame member 13 are preferably adjustable so as to vary the pressure at the sealing ring 22. The radial slots 35 are constantly in open communication with the interior of the reservoir 18, and when the valves 33 are positioned as shown at the left of Fig. 1, the cylinder displacement chambers 34 above the pistons 25, are in open communication with the slots 35 and reservoir 18 through the valve passages 36. If a valve 33 remains in this position, and the corresponding piston 25 is reciprocated within its cylinder 24, fluent material will be drawn from the receptacle 18 into the displacement chamber 34 on the down stroke of the piston, and will be forced back into the receptacle 18 from the chamber 34 during the up stroke. This back and forth movement or surging of the fluent material will continue as long as the corresponding valves 33 remain in position with the passage 36 upwardly and downwardly open; but when a valve 33 is rotated ninety degrees about its own axis to the position shown at the right of Fig. 1, this communication between the displacement chamber 34 and reservoir 18 is shut off, and the corresponding valve passage 36 is then connected with the displacement chamber 34 through the lateral port 37 and another port 67, and is also connected with the delivery orifice 41 by the port 37, thereby causing subsequent upward movement of the piston 25 to force fluent material from the cylinder 24 through the orifice 41 to the can 40.

Figure 5:
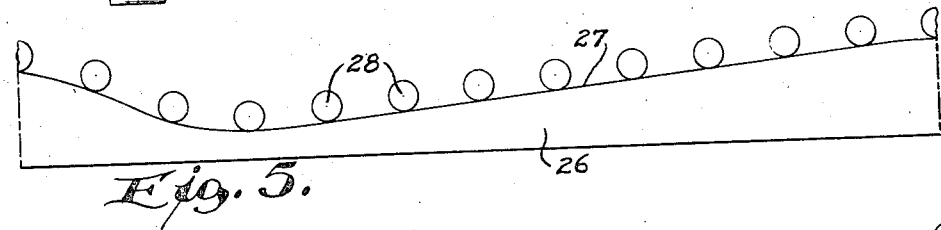
Fig. 5 is a diagram-development of a displacement plunger actuating annular cam of the type used with a single set of no-can-no-fill mechanisms.
Figure 6:
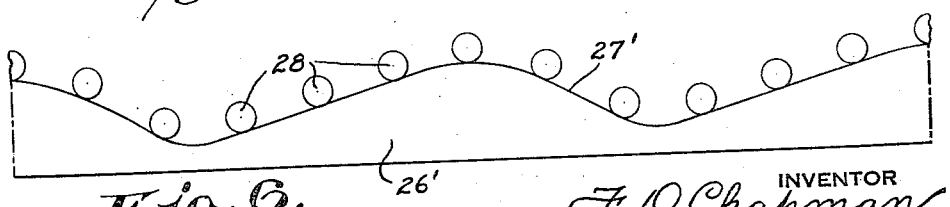
Fig. 6 is another diagram-development of a plunger actuating cam which may be used with two sets of valve trip mechanisms.

The successive pistons 25 are constantly reciprocated during rotation of the shaft 14, by the coaction between the rollers 28 and cam ring 26, and if the cam ring 26 and cam surface 27 are of the type shown in Fig. 1 and as developed in Fig. 5, each piston 25 will make one complete reciprocation during one complete revolution of its confining cylinder 24 about the axis of the shaft 14. However, the cam ring 26 may be modified or replaced by another having a cam surface formed to produce two or more reciprocations of each piston 25 during each complete revolution of its cylinder 24, so that two or more measured batches of material may be delivered to each can 40. In Fig. 6 is shown a modified cam ring 26' having a cam surface 27' which engages the rollers 28, and in this modified assemblage there are two similar humps on the actuating cam so that each piston 25 will be reciprocated twice during each complete revolution of its confining cylinder 24. The rollers 28 are rotatably suspended from their cross-heads 29 by means of pins 66, and the cross-heads 29 are attached to the piston rods 32 by removable pins 68. As previously indicated, the cross-heads 29 coact with parallel guide grooves 30 formed in the guide element 31, and this element is secured to and is rotatable with the shaft 14.

The improved mechanism for actuating the successive rotary control valves 33 is best shown in Figs. 1 to 4 inclusive, and each of these mechanisms consists of two parts shown in Figs. 3 and 4 respectively, and each of which is adjustable about the central axis of the machine along a stationary supporting element or ring 69 secured to the standards 10 and column 11. The outer end of each control valve 33 is provided with two radial arms 70, 71 and when these arms are positioned as shown at the left of Fig. 3 and at the right of Fig. 4 the corresponding valves 33 are positioned as shown at the left of Fig. 1. If the valve actuating arms 70, 71 are positioned as shown at the right of Fig. 3 and at the left of Fig. 4, then the corresponding valves 33 are positioned as shown at the right of Fig. 1. The trip mechanism for rotating each valve 33 from the position shown at the left, to the position right of Fig. 1, is shown in Figs. 2 and 3 and comprises a bracket 72 adjustably secured within a groove 72' in the supporting ring 69, by means of bolts 73; a lever 74 pivotally suspended at its medial portion from the lower end of the bracket 72 by a pivot bolt 75, and having at its lower end, a shoe 76 adapted to engage the successive cans 40 as they advance along the fixed can guide 77; and an elongated valve actuating cam 78 swingably suspended from the bracket 72 by means of a vertical pivot and coacting with an adjustable stop bolt 79, the cam 78 having its medial portion pivotally connected to the upper end of the upright lever 74 by a pin 80. The cam 78 is normally held away from the annular path of travel of the valve actuating levers 70, 71 by means of a spring 81 and as limited by the stop bolt 79, but whenever a can 40 engages the shoe 76, the lever 74 will swing about the bolt 75 thereby causing the cam 78 to swing about an upright pivot 74' into the path of advancement of the arms 70, 71 as in Figs. 2 and 3, and swinging those valves 33 which are positioned with the arm 71 down into position with these arms horizontally disposed. The trip mechanism for subsequently reversely rotating the valves 33 from open to closed position, is shown in Figs. 2 and 4, and comprises a bracket 82 adjustably secured within the groove 73 of the supporting ring 69, by means of bolts 83; and a cam 84 constantly disposed in the path of advancement of the valve actuating arms 70, 71, and rigidly attached to the bracket 82. The first cam 84 located in the path of travel of the arms 70, 71, is obviously operable as the valves 33 are advanced, to swing the arms 70 which have previously been disposed in vertical or valve-open position by the cam 78, into horizontal position as clearly illustrated in Fig. 4.

During normal operation of the improved receptacle filler the main shaft 49 is being revolved with the aid of the pulley 50 and is causing the movable parts of the machine to operate in unison. The central shaft 14 with its associated elements, is rotating in the direction of the arrow shown in Fig. 2, and the can feed disk 42 and the discharge disk 44 are being revolved as likewise indicated by the arrows in Fig. 2. Fluent material may be supplied to the fixed receptacle or reservoir 18 at any time during normal operation of the machine, and when no cans are being delivered to the supporting plate 38 by the feed mechanism, all of the valves 33 will remain in the position shown at the left of Fig. 1 and fluent material will merely surge back and forth from the reservoir 18 to and from the several displacement chambers 34, as the cylinders 24 revolve and the pistons 25 reciprocate. When cans 40 are actually delivered to the plate 38 and can hooks 39, these cans will be revolved about the central axis of the machine and will eventually engage the shoe 76 of the valve trip mechanism. As the shoe 76 is swung outwardly by the advancing cans 40, the lever 74 will cause the cam 78 to be positioned within the path of the valve actuating arms 71 as shown in Figs. 2 and 3, and the corresponding valves 33 will then be swung from closed to open position as shown at the right of Fig. 1. Depending upon the position of adjustment of the bracket 72 with respect to the supporting ring 69, the cam ring 26 will cause the pistons 25 to discharge material from the chambers 34 to the cans 40 at various positions of each piston 25 during its upper or return stroke. For example, if the trip mechanism is disposed in the lowest portion of the cam surface 27, then each piston 25 will deliver a maximum charge of material to each can 40. If the trip mechanism is advanced so that the valves 33 will be opened only when the displacement chambers 34 contain only one-half of their maximum capacities, then each can 40 will receive only one-half of the maximum volume of the corresponding displacement chamber 34.

The delivery of material from the displacement chamber 34 will continue as the corresponding cylinder 24 advances about the central machine's axis, and until the second trip mechanism is encountered. As each valve 33 passes the return trip mechanism shown in Fig. 4, the cam 84 will engage the upwardly extending arm 70 of the corresponding valve 33 and this valve will then be restored to closed position as shown at the left of Fig. 1. Depending upon the positioning of the bracket 82 along the supporting ring 69, this closing of the valves may be effected at any time either at the end of the discharge stroke of each piston 25, or prior thereto. The trip mechanisms comprising the cams 78, 84 therefore provide extremely flexible means for varying the capacities or volumes of the successive measured batches, and with the aid of a modified cam ring 26' such as shown in Fig. 6, two similar or different volume batches may be delivered to each can 40 prior to its discharge from the machine by the revolving disk 44 and can hooks 45.

From the foregoing detailed description it will be apparent that my present invention provides improved apparatus for delivering accurately pre-measured volumes of material to a succession of receptacles 40, and also provides simple and effective means for varying the volume of each pre-measured charge. The adjustment for varying the volumes may be made during normal operation of the machine, and when no cans are being supplied, the fluent material will merely be surged through the slots 35 and ports 36 and will thus prevent accumulation of material in the passages through which the material normally flows. The valves 33 and the measuring pockets 24 with their pistons 25 are obviously of simple, compact and durable construction and are readily accessible for cleaning so that the machine may be conveniently maintained in highly sanitary condition. The material supply receptacle 18 may of course be revolved with the plate 20, if so desired, but the stationary reservoir 18 has been found entirely satisfactory and the seal 22 has also been found most effective. The entire assemblage is obviously so simple that it will not become inoperative, and effects accurate filling automatically and in an expeditious manner. Various kinds of fluent material may be handled with this apparatus, and the improved filling assemblage has proven highly successful in actual commercial use.

It should be understood that it is not desired to limit this invention to the exact details of construction, or to the precise mode of operation, herein shown and described, for various modifications within the scope of the claims may occur to persons skilled in the art. It is also to be noted that the term "filling" as used herein is intended to cover either a complete or a partial filling of the receptacles, and the receptacles may also be of varied shape and capacity.

I claim:

1. In a filler, fluent material supply means, an annular series of measuring pockets revolvable about an upright axis beneath said supply means, a displacement plunger reciprocable in each of said pockets toward and away from said supply means during revolution of said pocket series about said axis, a fixed cam for reciprocating each of said plungers several times during each revolution thereof about said axis, a valve interposed between each pocket and said supply means for controlling delivery of material from said means to said pockets and from said pockets to successive receptacles, means for advancing successive receptacles about said axis with said pockets and said valves, a stationary supporting ring surrounding said axis and having an annular groove therein, and actuating mechanisms for said valves adjustable along said ring groove to cause said plungers to properly cooperate with said cam so as to deliver several batches of material of pre-determined volumes from each pocket to each of the successive receptacles.

2. In a filler, fluent material supply means, an annular series of measuring pockets revolvable about an upright axis beneath said supply means, a displacement plunger reciprocable in each of said pockets toward and away from said supply means during revolution of said pocket series about said axis, a fixed cam for reciprocating each of said plungers several times during each revolution thereof about said axis, a valve interposed between each pocket and said supply means for controlling delivery of material from said means to said pockets and from said pockets to successive receptacles, means for advancing successive receptacles about said axis with said pockets and said valves, a stationary supporting element extending about said axis, and actuating mechanisms for said valves adjustable about said axis along said element to cause said plungers to properly cooperate with said cam so as to deliver several batches of material of pre-determined volumes from each pocket to each of the successive receptacles.

FRANK D. CHAPMAN.